United States Patent Office 3,697,458
Patented Oct. 10, 1972

3,697,458
POLYURETHANE FOAM
Christian Burba, 1 Wilhelmstr., 4628 Lunen, Germany; Manfred Drawert, 4 Selmer Str., 4712 Werne, Germany; and Hartmut Voigt, 22 Fritz-Husemann-Str.; and Eugen Griebsch, 22 Steinstr., both of 475 Unna, Germany
No Drawing. Filed Aug. 8, 1969, Ser. No. 848,718
Claims priority, application Germany, Aug. 15, 1968, P 17 93 201.3
Int. Cl. C08g 22/14, 22/44
U.S. Cl. 260—2.5 AQ          1 Claim

ABSTRACT OF THE DISCLOSURE

Polyhydroxy compounds obtained by propoxylation of compounds of the formula $$(HO)_n\text{—}R\text{—}[OCA_2CH(OH)CH_2\text{—}]_q\text{—}Y_m$$

where Y is —OH or

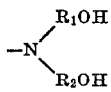

R is a divalent or trivalent hydrocarbon radical, or

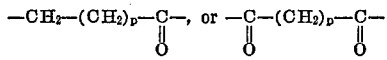

$R_1$ and $R_2$ are lower alkylene; and $m$, $n$, $p$, and $q$ have small integral values or are, in part, zero. Methods of making these compounds by propoxylation of the reaction product of: (1) a dialkanolamine and a monohalohydrin or epihalohydrin; (2) the hydrolyzed or dialkanolamine-reacted reaction product of a diol or triol and an epihalohydrin; or (3) the reaction product of a halocarboxylic acid or dicarboxylic acid and a dialkanolamine. Methods of making rigid polyurethane foams from these polyhydroxy compounds.

---

The present invention relates to polyhydroxy compounds and methods for their preparation, and to the use of these compounds for the manufacture of rigid and semi-rigid polyurethane foams.

A large number of polyhydroxy compounds suitable for the preparation of rigid polyurethane foams is known. Among these compounds should be mentioned those having a catalytically active tertiary nitrogen atom. The best known representative of polyhydroxy compounds of this type is N,N,N',N'-tetrakis-(2-hydroxypropyl)-ethylene diamine, prepared from ethylene diamine and propylene oxide (cf. U.S. Pat. 2,697,118). Because of the high functionality and advantageous OH— number of these compounds, a high cross-linking density results when they are mixed with polyester-polyols and polyether-polyols. The disadvantage of these nitrogen-containing polyols, however, lies in their limited utility, resulting either from their too-high viscosity or from the disadvantageous ratio of their hydroxy number to their amine number, which latter is not changed even by a high degree of propoxylation.

Various propoxylation products of alkanolamines, such as mono-, di-, and tri-ethanolamine (cf. U.S. Pat. 3,331,791 and French Pat. 1,365,894), exhibit the lower viscosities which are necessary for machine foaming. However, these compounds show a significantly smaller cross-linking when reacted with isocyanates, which is attributable to their lower functionality. The use of triethanolamine in polyurethane foams, which is described in the patent literature such as German patent publication 1,074,258, is limited to the use of catalytic amounts because of the great reactivity of the compound.

The polyhydroxy compounds of the present invention are obtained by partially or completely propoxylating a compound of the formula $(HO)_n\text{—}R\text{—}(Z)_q\text{—}(Y)_m$, wherein R is a divalent or trivalent hydrocarbon radical having 3 to 6 carbon atoms or such a radical interrupted by ether oxygen atoms, Z is —OCH$_2$CH(OH)CH$_2$—, and Y is —OH or

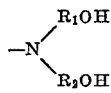

wherein $R_1$ and $R_2$ are alkylene radicals having 2 or 3 carbon atoms. Subscript $q$ is 0 or $m$; $m$ is 2 or 3 if $n$ is 0; $m$ is 1 or 2 when $n$ is 1; and $m$ is 1 when $n$ is 2. However, when $n$ is 0, $m$ is 2, $q$ is 0, and Y is

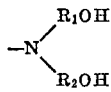

then R is

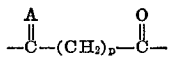

wherein $p$ is an integer from 0 to 4 and A is H$_2$ or oxygen.

These polyhydroxy compounds are prepared according to the present invention in several ways: (1) a monohalohydrin having more than one hydroxy group is reacted in a 1:1 molar ratio and in the presence of an agent for binding hydrohalic acid with a dialkanolamine having 2 or 3 carbon atoms in the alkyl group, or an epihalohydrin is similarly reacted with such a dialkanolamine, but in a 1:2 molar ratio; (2) an aliphatic diol or triol is reacted with an epihalohydrin in a 1:1–2 or 1:1–3 molar ratio, respectively, with opening of the epoxy ring and subsequent hydrolysis of the halogen atom or reaction thereof with a further equivalent of a dialkanolamine described above with cleavage of hydrohalic acid; or (3) a halocarboxylic acid, or a dicarboxylic acid, or an acid derivative thereof, is reacted with a dialkanolamine described above in a 1:2 molar ratio with cleavage of hydrohalic acid or water. In all cases, the resulting polyhydroxy compounds are then partially or completely propoxylated by reaction with propylene oxide.

Those reactions involving the reaction of a halogenous starting compound with a dialkanolamine, with cleavage of a hydrohalic acid, are suitably carried out at an elevated temperature, e.g. 120°–140° C. Condensation reactions involving cleavage of the epoxy ring of an epihalohydrin suitably proceed at somewhat lower temperatures, e.g. 80°–120° C. As known in the art an acid catalyst such as fluoroboric acid can be employed.

In the second step of the process for the preparation of polyols according to the present invention, the hydroxy groups of the polyhydroxy compounds defined by the general formula earlier herein are partially or completely propoxylated. The partial propoxylation should be carried out to such an extent that at least one —OH group of a polyhydroxy compound according to the general formula is propoxylated. As known in the art, the propoxylation suitably proceeds at a temperature between about 100° C. and 200° C., and may take place in the presence of alkaline catalysts. As is known in the art, in the alkali-catalyzed addition reaction of propylene oxide with primary hydroxy groups, primarily secondary hydroxy groups are formed.

The structure of the polyhydroxy compounds according to the present invention can be adjusted in many different ways, whereby desired hydroxy numbers and/or a specific functionality or a desired ratio of the hydroxy number to the amine number can be obtained. The polyhydroxy compounds according to the present invention having the highest functionality are obtained, for example, by reacting a dialkanolamine with a halo compound obtained by the addition of three mols of epihalohydrin to one mol of a trivalent alcohol.

Because of its greater degree of utility in the preparation of foams, the polyol formed, for example, by the reaction of chloroacetic acid with diethanolamine should be mentioned. The material has an advantageous ratio of the hydroxy number to the amine number.

It is also possible according to the invention to obtain amine-free polyhydroxy compounds by the reaction of diethanolamine with a dicarboxylic acid or an amide-forming derivative, instead of with a halocarboxylic acid. As known in art, such amidification reactions suitably proceed at temperatures between about 150° C. and 250° C.

Nitrogen-free cross-linking agents for polyurethane foams are obtained by reacting an aliphatic diol or triol with an epihalohydrin such as chlorohydrin to transform them into the corresponding halohydrin ethers. The resulting compounds are then completely hydrolyzed in an aqueous weakly-alkaline medium to polyhydroxy compounds. These compounds have low viscosity and high functionality even before propoxylation.

The viscosity of the propoxylated products clearly depends on the degree of propoxylation, that is with increasing addition of propylene oxide, viscosity decreases. In this way, it is possible to control the reactivity of the polyols according to the present invention.

Those polyhydroxy compounds which have the highest functionality and the highest hydroxy number in combination with the lowest possible viscosity are preferred for the preparation of polyurethane foams. This is particularly of significance with reference to the preparation of foams in machines.

In preparing polyurethanes, the polyhydroxy compounds according to the present invention can be combined with other conventional polyhydroxy compounds, with which they are completely compatible over a broad mixing range. In such mixtures, the content of polyols containing tertiary amino nitrogen is limited by the activation characteristic of these compounds. In general, the amine number of such a mixture should not exceed 100. Those polyols free of tertiary amino nitrogen can also be used without admixture with other conventional hydroxy compounds.

By a suitable choice of bridging members in the polyhydroxy compounds according to the present invention, the desired degree of cross-linking in a polyurethane product can be well-controlled. In addition, the reactivity of the foam system can be adjusted by adjusting the widely-variable content of tertiary amino nitrogen therein. In this way, the addition of other expensive catalysts can be obviated.

A better understanding of the present invention and of its many advantages will be had by referring to the following specific examples, given by way of illustration.

EXAMPLE 1

Propoxylated 1,8-dihydroxy-9-(diethanolamino)-3,6-dioxanonane 318 grams (3 mols) of diethylene glycol are warmed to 85° C. in an apparatus equipped with a stirrer. After addition of 0.6 gram of fluoroboric acid, 278 grams (3 mols) of epichlorohydrin are added dropwise over a period of two hours at a rate such that a temperature of 85° C.–95° C. is maintained. After all of the epichlorohydrin has been added, the mixture is cooled to a temperature of 20°–25° C. over a period of 12 to 15 hours.

In other apparatus equipped with a stirrer, 315 grams (3 mols) of diethanolamine are heated to 130° C. The first-formed chlorohydrin ether is added dropwise over a period of an hour at a temperature of 130° C.–140° C. The material is permitted to react further for one hour and, after cooling to 90° C., 120 grams (3 mols) of sodium hydroxide are added in the form of a 50 percent aqueous solution. Water then is distilled off in vacuum until a maximum sump temperature of 130° C. is reached.

522 grams (9 mols) of propylene oxide are now added at 140° C. After the propylene oxide addition has ceased, the apparatus is briefly evacuated. After cooling to about 100° C., sodium chloride is filtered off.

The polyether polyol obtained in this manner has a viscosity of 12 poises at 23° C., a hydroxy number of 522 (calculated=508), and an amine number of 130 (calculated=127).

EXAMPLE 2

Propoxylated 2,12-dihydroxy-1,13-bis-(diethanolamino)-4,7,10-trioxatridecane 840 grams (8 mols) of diethanolamine are warmed to 130° C. in a 6-liter reaction vessel. Over a period of one hour, 165 grams (4 mols) of bis-chlorohydrin ether are added at a temperature of 130° C.–140° C., said reactant being obtained from 4 mols of diethylene glycol and 8 mols of epichlorohydrin as described in Example 1. This temperature is maintained for one additional hour and the reaction mixture is then cooled to 90° C.

After the addition of 320 grams (8 mols) of sodium hydroxide in the form of a 50 percent solution and removal of the water, 390 grams (24 mols) of propylene oxide are added at 140°–150° C.

After heating in vacuum and removal of the sodium chloride by filtration, as described in Example 1, a polyol having a hydroxy number of 484 (calculated=434) and an amine number of 154 (calculated=144) is obtained. The viscosity at 25° is 23.7 poises.

EXAMPLE 3

Propoxylated 1,2,12,13-tetrahydroxy-4,7,10-trioxa-tridecane 5.3 kilograms (50 mols) of diethylene glycol are heated to 85° C. in a 50-liter reaction vessel. After the addition of 15 grams of fluoroboric acid, 9.25 kilograms (100 mols) of epichlorohydrin are added with a dosing pump over a period of 3 hours while the temperature is held at 90°–95° C. by cooling. The reaction mixture is then permitted to cool overnight.

The reaction product is now heated to about 95° C. and 22.83 kilograms of a 25 percent aqueous sodium bicarbonate solution are added dropwise over a period of one hour. Immediately there is strong evolution of $CO_2$. The reaction mixture is permitted to boil under reflux for a further 8 hours, at which point water is removed by distillation. The remaining water is removed at 130° C. in vacuum.

The mixture is now heated to 140° C. and 5.8 kilograms (100 mols) of propylene oxide are added dropwise at 140° C.–145° C. After the propylene oxide addition is over, the vessel is evacuated briefly and the sodium chloride formed is removed after cooling to 100° C.

The polyether polyol obtained had a hydroxy number of 596 (calculated=606) and a viscosity of 21.7 poises at 23° C.

EXAMPLE 4

Propoxylated 1,2,9,10-tetrahydroxy-4,7-dioxa-decane 310 grams (5 mols) of ethylene glycol are reacted with 925 grams (10 mols) of epichlorohydrin in the presence of 2.2 grams of fluoroboric acid, as described in Example 1.

Subsequently, as described in Example 3, the mixture is hydrolyzed with 2120 grams of a 25 percent aqueous sodium bicarbonate solution, and propoxylated with 580 grams (10 mols) of propylene oxide, as described in Example 1.

After removal of the sodium chloride, a polyol having a hydroxy number of 721 (calculated=688) and a viscosity of 36.6 poises at 23° C. is obtained.

EXAMPLE 5

Propoxylated propane-1,2,3-tris[2'-hydroxy-3'-(diethanolamino)-1'-propyl ether]

As described in Example 1, 92.1 grams (1 mol) of glycerin are reacted with 277.5 grams (3 mols) of epichlorohydrin in the presence of 0.3 gram of fluoroboric acid.

This chlorohydrin ether is now condensed with 315 grams (3 mols) of diethanolamine, as described in Example 1. The hydrochloride formed is neutralized with 240 grams of 50 percent aqueous sodium hydroxide.

After the removal of water, the addition of 522 grams (9 mols) of propylene oxide, and the filtration of sodium chloride from the polyol, a product is obtained having a viscosity of 77.1 poises at 23° C., a hydroxy number of 458 (calculated=461), and an amine number of 147 (calculated=154).

EXAMPLE 6

Propoxylated propane-1,2,3-tris(2',3'-dihydroxy-1'-propyl ether)

The adduct formed between 1 mol of glycerin and 3 mols of epichlorohydrin in the presence of fluoroboric acid, as in Example 1, is heated under reflux for 8 hours with 1.5 mols of sodium carbonate in the form of a 25 percent aqueous solution. After removal of the water, 6 mols of propylene oxide are added.

After the sodium chloride has been separated, a polyol having a hydroxy number of 561 (calculated=509) is obtained.

EXAMPLE 7

In the presence of fluoroboric acid, 278 grams (3 mols) of epichlorohydrin are added, as described in Example 1, to 409 grams (3 mols) of hexanetriol-1,2,6 having a hydroxy number of 1235. The material is then reacted with 325 grams (3 mols) of diethanolamine also as described in Example 1.

After the addition of 240 grams of a 50 percent aqueous sodium hydroxide solution for neutralization of hydrochloric acid, and after removal of water, 522 grams (9 mols) of propylene oxide are added.

The polyol obtained after the removal of sodium chloride has a viscosity of 94.8 poises at 23° C., a hydroxy number of 591 (calculated=598) and an amine number of 130 (calculated=120).

EXAMPLE 8

343 grams (1.5 mols) of chlorohydrin ether prepared from 1.5 mols of hexanetriol-1,2,6 (hydroxy number= 1235) and 1.5 mols of epichlorohydrin, all as described in Example 1, are heated under reflux for 9 hours with 88 grams of sodium bicarbonate in the form of a 20 percent solution. After removal of water, 174 grams (3 mols) of propylene oxide are added and the sodium chloride formed is removed by filtration.

The viscosity of the resulting polyol is 67.3 poises at 23° C. Its hydroxy number is 657 (calculated=691).

EXAMPLE 9

Propoxylated 1,3-bis-(diethanolamino)-propanol-2

A 50 liter vessel is filled with 10,154 kilograms (100 mols) of diethanolamine which is then heated to 130° C. 4625 kilograms (50 mols) of epichlorohydrin are then injected over a period of three hours with a dosing pump. The temperature is maintained at 135° C.–140° C. by cooling. This temperature is maintained for another two hours whereupon 4 kilograms of 50 percent sodium hydroxide are added dropwise over a period of one hour with cooling. In this operation, the temperature falls to 115° C. and is held at this value for two hours. The material is next heated to 140° C. and the water is removed in a vacuum of 0.5 mm. Hg.

14.5 kilograms (250 mols) of propylene oxide are now added dropwise at 140° C. After addition is completed, this temperature is maintained for an additional hour, then the mixture is cooled to 100° C. and the sodium chloride formed is removed by filtration.

A polyol having a hydroxy number of 520 (calculated=504) and an amine number of 210 (calculated= 202) and a viscosity of 25 poises at 23° C. is obtained.

EXAMPLE 10

Propoxylated N,N,N',N'-tetrakis-(2-hydroxyethyl)-aminoacetamide 840 grams (8 mols) of diethanolamine are heated to 135° C. in a reaction vessel equipped with a water separator. Over a period of one hour, a solution of 378 grams (4 mols) of monochloroacetic acid mixed in 120 ml. of water is added dropwise while the temperature is kept at 135° C.–140° C. This temperature is maintained for a further hour and water which has not be distilled off is removed in vacuum at a maximum temperature of 130° C. When the temperature has dropped to 110° C., 928 grams (16 mols) of propylene oxide are added at 110°– 120° C. After the completion of the propylene oxide condensation, the material is heated to a maximum of 140° C. in vacuum and the sodium chloride formed is removed by filtration.

The polyol obtained has a viscosity of 8.6 poises at 23° C., a hydroxy number of 510, and an amino number of 145.

EXAMPLE 11

Propoxylated 1,2-dihydroxy-3-(diethanolamino) propane 210 grams (2 mols) of diethanolamine are heated to a temperature of 130° C. in an apparatus equipped with a stirrer. 221 grams (2 mols) of 3-chloro-propanediol-1,2- are then added dropwise over a period of one hour at constant temperature. The temperature is maintained for one further hour, 160 grams of 50 percent aqueous NaOH are added, and the water is then removed in vacum.

348 grams (6 mols) of propylene oxide are subsequently added at 140° C.–150° C. After propoxylation is completed, the vessel is evacuated briefly and the sodium chloride formed is removed when the temperature has been reduced to 100° C.

Hydroxy number=630 (calculated=635)
Amino number=161 (calculated=159)
Viscosity=47.5 poises at 23° C.

EXAMPLES 12–17

Polyurethane foams were prepared from the components shown below in Table I by quickly and thoroughly stirring the components and then pouring them into an open mold. The table also reports certain properties of the polyurethane products prepared from the polyhydroxy compounds of the present invention. The foaming agents, catalysts, and foam stabilizer are all conventional additives employed in amounts conventional in the art.

TABLE I

| Example No. | Components (grams) | | | | | | | | | | | Density (kg./cm.²) | Compression resistance (kg./cm.²) |
|---|---|---|---|---|---|---|---|---|---|---|---|---|---|
| | a | b₁ | b₂ | c | d | e | f₁ | f₂ | g | h | i | | |
| 12 | 50 | 40 | | | 10 | 25 | 1.0 | | 1.0 | 1.0 | 124 | 31 | 2.2 |
| 13 | 30 | 20 | | 50 | | 30 | 0.1 | | 1.5 | 1.0 | 124 | 31 | 2.5 |
| 14 | 40 | 30 | | 30 | | 25 | 0.1 | | 1.0 | 1.0 | 115 | 30 | 2.2 |
| 15 | 40 | 40 | | 20 | | 25 | | 0.1 | 1.0 | 1.0 | 126 | 31 | 2.2 |
| 16 | | | 70 | 30 | | 30 | | 0.1 | 1.0 | 1.0 | 145 | 30 | 2.2 |
| 17 | | | 100 | | | 30 | | 0.8 | 1.5 | 1.0 | 140 | 35 | 2.0 |

Components: (a) Monopropoxylated bis-ethanolamide of a commercial dimeric tall oil fatty acid; (b₁) Dipropoxylated 1,2,12,13-tetrahydroxy-4,7,10-trioxa-tridecane; (b₂) Tetrapropoxylated 1,2,12,13-tetrahydroxy-4,7,10-trioxa-tridecane; (c) Propoxylated 1,3-bis-(diethanolamino)-propanol-2; (d) N,N,N',N'-tetrakis-(2-hydroxypropyl)-ethylene diamine; (e) Trichloromonofluoromethane (foaming agent); (f₁) Dimethylpiperazine; (f₂) N,N-dimethylethanolamine (amine catalysts); (g) Polysiloxane foam stabilizer; (h) Water; (i) 4,4'-diisocyanato-diphenylmethane.

What is claimed is:

1. In a polyurethane foam prepared by reaction of a polyhydroxy compound and a polyisocyanate in the presence of a foaming agent, the improvement wherein said polyhydroxy compound is prepared by partially or completely propoxylating, by reaction with propylene oxide, a polyhydroxy intermediate which is the product prepared by reacting an aliphatic diol or triol with 1-2 or 1-3 mols, respectively, of an epihalohydrin to open the epoxide ring, and then reacting the resulting halogen compound with an equivalent amount of a dialkanolamine having 2 or 3 carbon atoms in the alkylene groups thereof.

References Cited

UNITED STATES PATENTS

| | | | |
|---|---|---|---|
| 3,578,612 | 5/1971 | Burba | 260—77.5 AQ |
| 3,267,080 | 8/1966 | Kamal | 260—77.5 |
| 3,245,924 | 4/1966 | Cox | 260—2.5 |
| 3,105,063 | 9/1963 | Damusius | 260—77.5 |
| 3,094,434 | 6/1963 | Chapman | 260—2.5 X |

OTHER REFERENCES

Jefferson: Urethane Chemicals Product Data, Thanol SF-1500; 1964.

DONALD E. CZAJA, Primary Examiner

C. W. IVY, Assistant Examiner

U.S. Cl. X.R.

260—2.5 AP, 77.5 AP, 77.5 AQ, 404.5, 561 R, A, B, 584 B, 615 B